United States Patent [19]
Whitinger

[11] 3,934,474
[45] Jan. 27, 1976

[54] HOLDING AND MONITORING APPARATUS FOR INTRAVENOUS INFUSION CONTAINER

[75] Inventor: Robert G. Whitinger, Carmel, Ind.

[73] Assignee: Methodist Hospital of Indiana Inc., Indianapolis, Ind.

[22] Filed: Oct. 26, 1973

[21] Appl. No.: 409,798

Related U.S. Application Data

[63] Continuation-in-part of Ser. No. 270,336, July 10, 1972, abandoned.

[52] U.S. Cl............ 73/296; 116/129 R; 128/214 E; 177/234
[51] Int. Cl.² ......................................... G01F 23/20
[58] Field of Search...................... 73/296, 318, 321; 116/114 B, 118, 129 R; 128/214 E; 177/174, 225, 230, 234; 200/85

[56] References Cited
UNITED STATES PATENTS

| | | | |
|---|---|---|---|
| 304,546 | 9/1884 | O'Grady | 177/234 |
| 698,334 | 4/1902 | Smith | 177/234 |
| 849,807 | 4/1907 | Pagel | 73/321 |
| 1,254,495 | 1/1918 | Gibson | 177/234 |
| 1,999,073 | 4/1935 | Awret | 116/129 R |
| 2,706,755 | 4/1955 | Krasno | 128/214 E |
| 2,944,809 | 7/1960 | Heil | 177/231 |
| 3,107,745 | 10/1963 | Bujah | 177/233 |
| 3,242,924 | 3/1966 | Kraft et al. | 128/214 E |
| 3,287,721 | 11/1966 | Baehr | 128/214 E |
| 3,425,415 | 2/1969 | Gordon | 128/214 E |
| 3,437,243 | 4/1969 | Farnsworth | 116/118 X |

FOREIGN PATENTS OR APPLICATIONS

| | | | |
|---|---|---|---|
| 1,049,816 | 11/1966 | United Kingdom | 177/229 |

*Primary Examiner*—S. C. Swisher
*Attorney, Agent, or Firm*—Woodard, Weikart, Emhardt & Naughton

[57] ABSTRACT

An apparatus for holding and monitoring an intravenous infusion container. A pulley wheel is rotatably mounted to a base and wrappingly receives a line which is connected to the intravenous infusion container for the suspended mounting thereof. The axle of the pulley wheel extends through a discshaped base having a plurality of markings thereon. A pointer is fixed and mounted to the axle adjacent to the base. The intravenous infusion container when full causes the axle to rotate so as to position the pointer adjacent to a marking. A spring returns the wheel and pulley wheel to an original position as liquid drains from the container.

1 Claim, 7 Drawing Figures

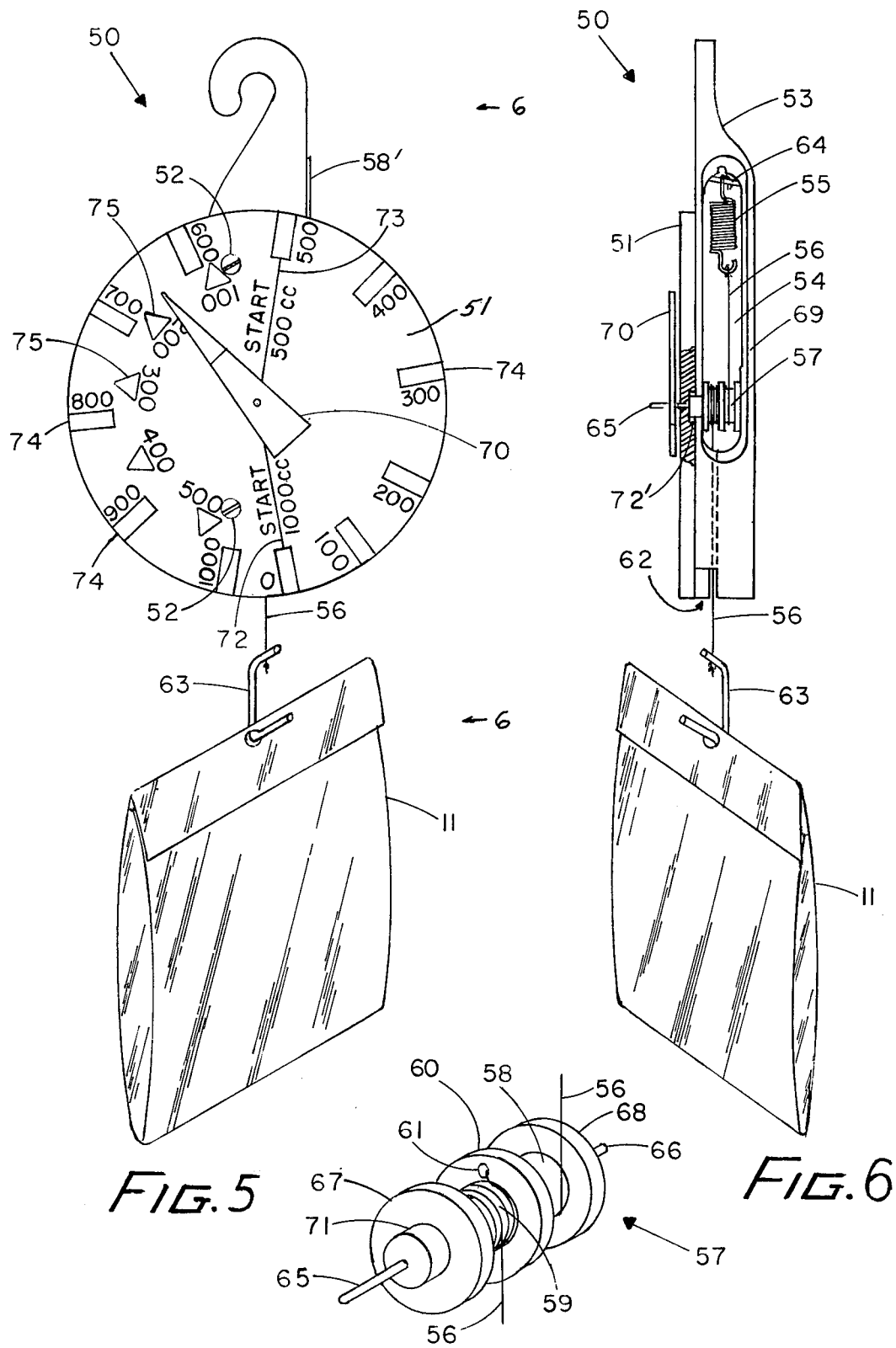

HOLDING AND MONITORING APPARATUS FOR INTRAVENOUS INFUSION CONTAINER

CROSS REFERENCE TO RELATED APPLICATION

This is a continuation-in-part of my U.S. Pat. application, Ser. No. 270,336, now abandoned.

BACKGROUND OF THE INVENTION

1. Field of the Invention

This invention is in the field of intravenous infusion, and particularly to a new and improved apparatus for holding and monitoring an intravenous infusion container.

2. Description of the Prior Art

Intravenous infusion containers previously were glass rigid bottles. In recent years, these bottles have been replaced by plastic containers which collapse as the liquid is drained from the container. Efforts have been made to mark the plastic containers so as to indicate the amount of liquid contained therein. These efforts have not been entirely successful since the configuration of the container changes as the liquid drains from the container. As a result, various devices have been provided for measuring the amount of liquid drained from the infusion containers. A typical device which employs a linear spring is disclosed in the U.S. Pat. No. 3,425,415 issued to E. S. Gordon et al. The Gordon apparatus requires the container to be suspendedly mounted to a vertical spring. As the container empties, the weight of the container causes the indicator in the spring to move upwardly. In addition, the container and the tubes connected to the intravenous infusion container also move upwardly. In many cases, the container is moved a sufficient distance upwardly so that the nurse is unable to reach the hook for replacing the bottle. Similar devices are disclosed in the following U.S. Pat. Nos.: 3,242,924; 3,287,721; and 3,469,574.

Disclosed herein is an apparatus which utilizes a helical spring for supporting the intravenous infusion container and as a result, the vertical movement of the container is much smaller as compared to the prior art devices. In addition, a pointer is mounted to the apparatus for indicating the weight of the container as the liquid is drained therefrom. A markable plastic sheet is mounted adjacent to the pointer allowing the nurse or other operator to mark thereon the predicted positions of the pointer thereby allowing the nurse or operator to later check to determine if the pointer is located at the right position corresponding to the appropriate liquid flow rate. Various gauges of interest are disclosed in the following U.S. Pat. Nos.: 849,807; 1,999,073 and 2,706,755.

SUMMARY OF THE INVENTION

One embodiment of the present invention is an apparatus for holding an intravenous infusion container and for allowing measurement of relative amounts of liquid within the container over a period of time comprising a base, a member mounted to the base and having a first marking and a second marking provided thereon, an axle extending through the member being rotatably mounted on the base and rotatable through an angle to and from the first marking and the second marking, a pointer removably mounted to the axle adjacent the member, the pointer movable through an arc, the pointer being positioned at one end of the arc when the axle is positioned at an end of the angle corresponding to the first marking with the pointer positioned at the other end of the arc when the axle is positioned at an end of the angle corresponding to the second marking, a line connectable to the container for suspendedly holding the container, the line being wrappingly received on the axle, and a spring mounted in the base being yieldable under the weight of the container when full to allow the axle to rotate through the angle to the first marking and to urge the axle to rotate back through the angle to the second marking as the container empties.

It is an object of the present invention to provide a new and improved apparatus for holding an intravenous infusion container.

It is the further object of the present invention to provide a new and improved apparatus for monitoring or measuring the relative amounts of liquid within the intravenous infusion containers over a period of time.

Related objects and advantages of the present invention will be apparent in the following description.

BRIEF DESCRIPTION OF THE DRAWINGS

FIG. 5 is a front view of the preferred embodiment of the present invention with an intravenous infusion container suspendedly mounted thereon.

FIG. 6 is a side view looking in the direction of arrows 6—6 of FIG. 5.

FIG. 7 is an enlarged perspective view of the spool within the device of FIG. 6.

DESCRIPTION OF THE PREFERRED EMBODIMENTS

Figure 1:
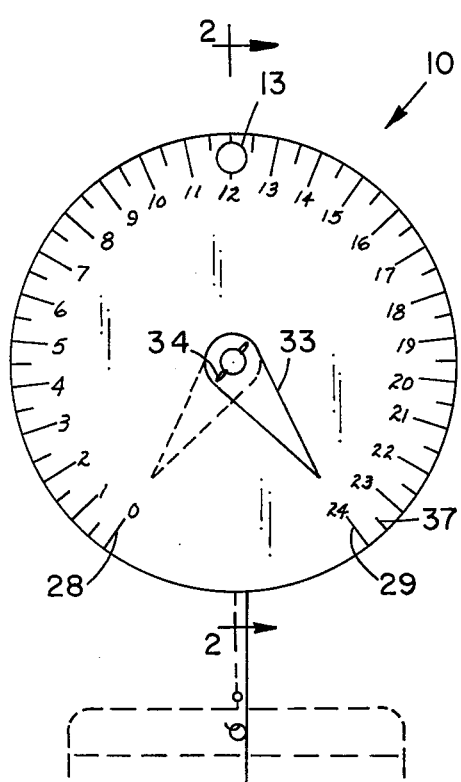
FIG. 1 is a front view of an apparatus incorporating the present invention with an intravenous infusion container suspendedly mounted thereon.
Figure 1:
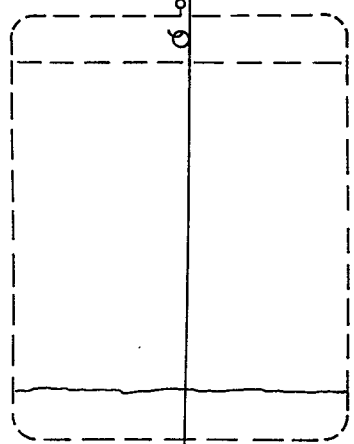
Figure 1:
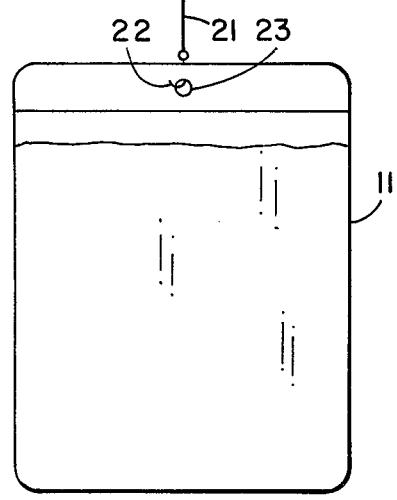
Figure 2:
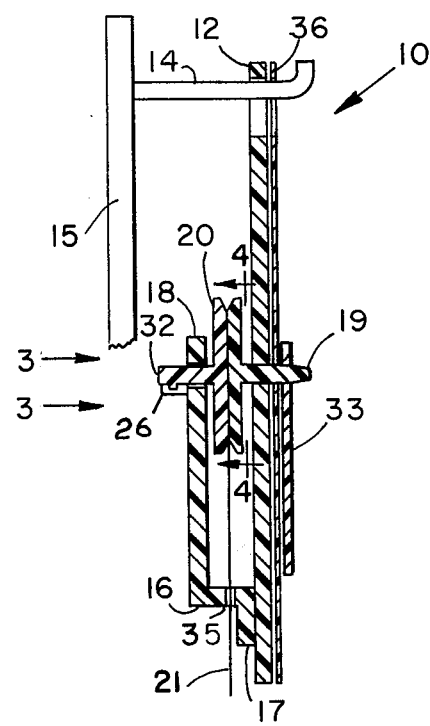
FIG. 2 is a fragmentary cross sectional view taken along the line 2—2 of FIG. 1 and viewed in the direction of the arrows.
Figure 3:
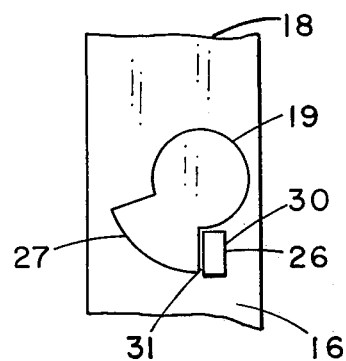
FIG. 3 is a fragmentary enlarged rear view looking in the direction of arrows 3—3 of FIG. 2.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 4:
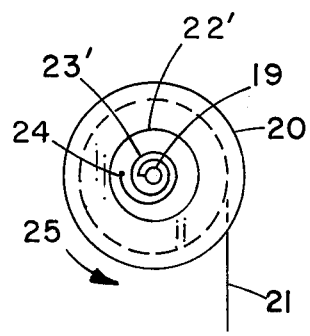
FIG. 4 is an enlarged cross sectional view taken along the line 4—4 of FIG. 2 and viewed in the direction of the arrows.

Referring now more particularly to the drawings, there is shown an apparatus 10 for holding an intravenous infusion container 11 and for allowing measurement of the relative amounts of the liquid within container 11 over a period of time. Apparatus 10 includes a base 12 which is shaped like a disc having a hole 13 extending therethrough for receipt of a hook-shaped arm 14 connected to a floor stand 15. Bracket 16 has a bottom end 17 secured to base 12 with the top end 18 of the bracket spaced from the rear surface of base 12. Axle 19 is rotatably mounted on base 12 and bracket 16. A pulley wheel 20 is integrally mounted to axle 19 and wrappingly receives line 21. The bottom end of line 21 has a hook 22 connected thereto which extends through aperture 23 of the intravenous infusion container 11. Pulley wheel 20 is hollow having a recess 22'. A helical spring 23' is mounted within recess 22' having an inner end fixedly connected to axle 19 and an outer end 24 fixedly connected to base 12. The helical spring as viewed in FIG. 4 extends from axle 19 in a clockwise direction to end 24. As a result, the pulley wheel is urged by spring 23' to rotate in the direction of arrow 25 whereas the weight of a full container 11 urges the pulley wheel to rotate in a direction opposite of arrow 25. In FIG. 1, the solid line position of pointer 33 and container 11 corresponds to when the container is full whereas the dashed line position of the pointer and container corresponds to when the container is empty.

A stop which is a protruding rod 26 is mounted to bracket 16 and is therefore connected to base 12. Rod 26 has a first stop surface 30 and a second stop surface 31. End 32 of axle 19 has a protruding portion 27 for abutting rod 26 thereby limiting the rotatable motion of the axle to an angle less than 360° but more than 180°. A pointer 33 is mounted to the opposite end of axle 19 and is secured thereon by pin 34. The pointer which is adjacent to base 12 is movable through an arc corresponding to the angle of rotation of axle 19. Base 12 is provided with a plurality of markings thereon for locating pointer 33. The weight of container 11 is sufficient when mounted to hook 22 to cause pointer 33 to pivot to the marking 29. As the container empties, the helical spring will cause pointer 33 to rotate in a counterclockwise direction as viewed in FIG. 1 to the empty marking 28. A typical 1000 ml container holding 5 percent dextrose in water weights approximately two and one-half pounds. In one embodiment, such a 1000 ml container would cause pointer 33 to pivot to marking 29. Pointer 33 moves through an arc from marking 29 to marking 28. The pointer is positioned adjacent to marking 29 when axle 19 is positioned at one end of its angle of rotation which corresponds to protrusion 27 contacting stop surface 31 of rod 26. Pointer 33 is located adjacent marking 28 when the axle is rotated through the angle to the opposite end corresponding to protrusion 27 contacting stop surface 30 of rod 26. The helical spring is yieldable under the weight of the container when full to allow the axle to rotate through the angle of rotation so as to position protrusion 27 against stop surface 31. The helical spring normally urges the axle to rotate back through the angle of rotation so as to position protrusion 27 against stop surface 30 when the container is empty. Bracket 16 includes a hole 35 through which line 21 freely passes.

A markable transparent plastic member 36 which is disc configured is mounted over base 12 between the base and the pointer. As a result, the operator may mark the exterior surface of member 36 with an item such as a grease pencil. Member 36 may be marked adjacent pointer 33 when the liquid initially begins to flow from container 11. The predicted locations of pointer 33 may then be marked corresponding to the various times after the initiation of the liquid flow. For example, if a liquid flow rate is desired so as to empty the container sufficiently to position pointer 33 at marking 37 after one hour of liquid flow, then a mark should be placed adjacent to mark 37. At the end of one hour, if the pointer has not reached marking 37, then the liquid flow rate should be increased. On the other hand, if the pointer has moved past marking 37, then the liquid flow rate should be decreased. A scale having markings 28, 29, 37 and the remainder of the markings shown on the base may be printed on paper and affixed to the base. Hole 13 extends both through base 12 and member 36 to facilitate the mounting of the apparatus to the stand 15.

Many variations are contemplated and included in this invention. For example, in one embodiment the pulley wheel and shaft were produced from a single piece of molded plastic whereas in another embodiment, the pulley wheel and shaft were connected but were separately produced. Likewise, in lieu of positioning the stop rod 26 on bracket 16, it is possible to position the stop on base 12 so as to contact pointer 33. The end of axle 19 is tapered thereby allowing the pointer to be slipped on the axle.

It will be obvious from the above description that member 36 permits the inscribing of the hours that a particular volume of delivery of liquid should occur. It will be further obvious from the above description that the apparatus may be utilized for holding a variety of liquids such as blood, plasma, saline, glucose, and other agents.

The preferred embodiment of the apparatus is shown in FIGS. 5 and 6. Apparatus 50 includes a disc-shaped member 51 secured by screws 52 to a hollow hook-shaped member 53. Cavity 54 is provided in member 53 for containing helical spring 55, line 56 and spool 57. A plate 58' is secured to member 53 closing cavity 54.

Spool 57 (FIG. 7) has a pair of line receiving drums 58 and 59 separated by wall 60. Line 56 is attached to the bottom end of spring 55 and extends downwardly being wrapped around drum 58. Line 56 then extends through hole 61 of wall 60 and is wrapped on drum 59 before extending downwardly from cavity 54 through passage 62 to hook 63. Line 56 is attached to hook 63 which removably holds intravenous infusion container 11. The top end of spring 55 is fastened over pin 64 mounted to member 53.

Spool 57 includes a pair of axles 65 and 66 extending outwardly from the bearing side walls 67 and 68. Axle 66 is rotatably received in a socket provided in wall 69 of member 53 whereas axle 65 extends outwardly through member 51 with a pointer 70 mounted to the outer end of axle 65. Bearing boss 71 is provided between axle 65 and wall 67 and is rotatably received in a recess 72' in member 51.

Intravenous infusion container 11 is available in a 1000 cc size or a 500 cc size. Member 51 is provided with suitable markings to allow the reader to determine the amount of liquid which has drained from the container. After the intravenous container is hung on hook 63, pointer 70 may be removed by pressing the thumb and forefinger under the pointer at the shaft location. The pointer is then aligned with either line 72 or 73 depending upon whether container 11 is a 1000 cc container or a 500 cc container. The pointer is aligned with line 72 if a 1000 cc container is utilized whereas the pointer is aligned with line 73 for a 500 cc container. The pointer is then pressed back onto axle 65. Thus, the pointer has an original position aligned either with line 72 or 73 when the container is completely full. The flow is then adjusted in accordance with the flow rate desired. Ten markings 74 are provided on the outer circumferential edge portion of member 51 with each marking 74 indicating that an additional amount of 100 cc has drained from the container. Markings 74 are provided to allow the reader to determine the amount of liquid drained from the 1000 cc container. Additional markings 75 are provided on member 51 and are located inwardly of markings 74. Five of the markings 75 are provided to allow the reader to determine the amount of fluid drained from the 500 cc container. A black china marking pencil may be utilized to mark the anticipated hour of drainage of various amounts of liquid from the container thereby allowing for an easy check to determine if the liquid is draining in accordance with the desired schedule.

While the invention has been illustrated and described in detail in the drawings and foregoing description the same is to be considered as illustrative and not restrictive in character, it being understood that only a few embodiments have been shown and described and that all changes and modifications that come within the spirit of the invention are desired to be protected.

The invention claimed is:

1. An apparatus for holding an intravenous infusion container and for allowing measurement of relative amounts of liquid within the container over a period of time comprising:

a base;

a markable sheet mounted to said base and having a first marking and a second marking provided thereon;

an axle extending through said sheet being rotatably mounted on said base and rotatable about an axis through an angle to and from said first marking and said second marking;

a pointer removably mounted to said axle adjacent said sheet, said pointer movable through an arc about said axis, said pointer being positioned at one end of said arc when said axle is positioned at an end of said angle corresponding to said first marking with said pointer positioned at the other end of said arc when said axle is positioned at an end of said angle corresponding to said second marking, said pointer having a vertically stationary axis of rotation;

a line connectable to said container for suspendedly holding said container, said line being wrappingly received on said axle;

a helical spring having one end connected to said base and an opposite end connected to said line being yieldable under the weight of said container when full to allow said axle to rotate through said angle to said first marking and to urge said axle to rotate back through said angle to said second marking as said container is emptied;

a spool rotatably mounted by said axle in said base, said line having one end connected to said spring and an opposite end connected to a hook upon which said container is removably mounted, said line being wrapped around said spool;

said spool includes a wall and a pair of drums spaced apart by said wall, said line is wrapped around one of said drums and then extends through said wall and is then wrapped around the other of said drums.

* * * * *